C. P. HEPLER.
SIGNAL LAMP FOR VEHICLES.
APPLICATION FILED DEC. 28, 1916.
1,249,956.
Patented Dec. 11, 1917.
2 SHEETS—SHEET 1.
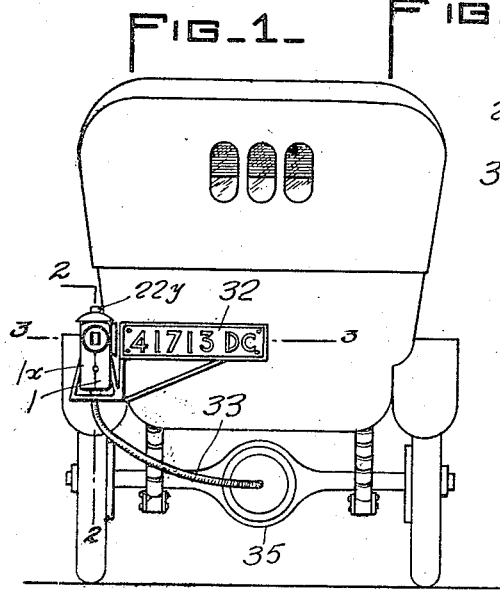
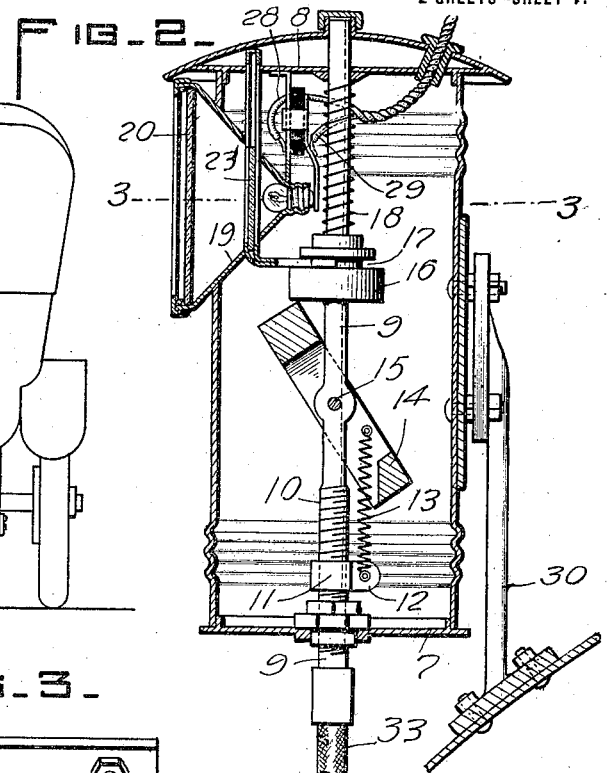
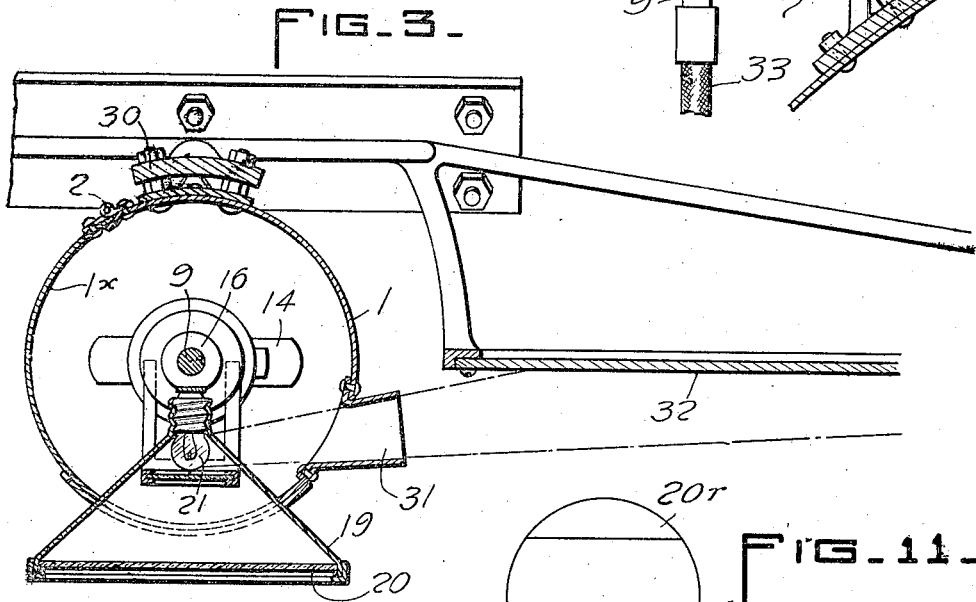
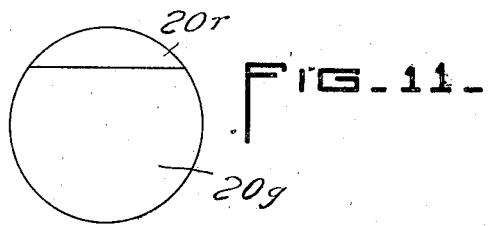
WITNESSES
INVENTOR
COWAN P. HEPLER,
BY
ATTORNEYS C. P. HEPLER.
SIGNAL LAMP FOR VEHICLES.
APPLICATION FILED DEC. 28, 1916.
1,249,956.
Patented Dec. 11, 1917.
2 SHEETS—SHEET 2.
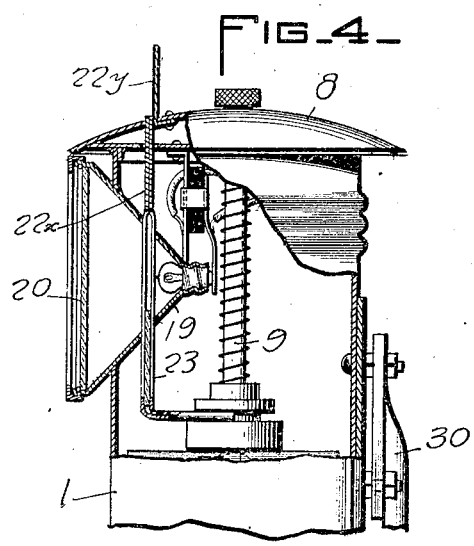
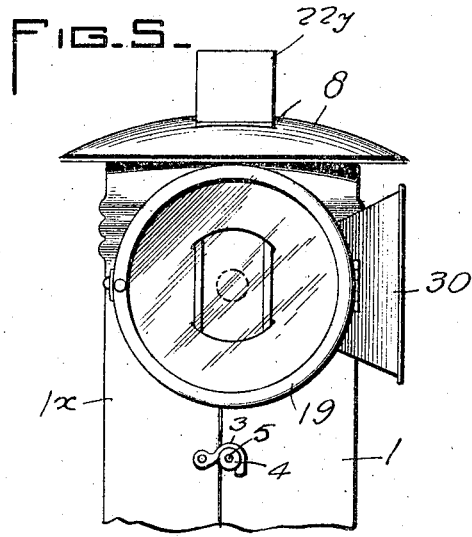
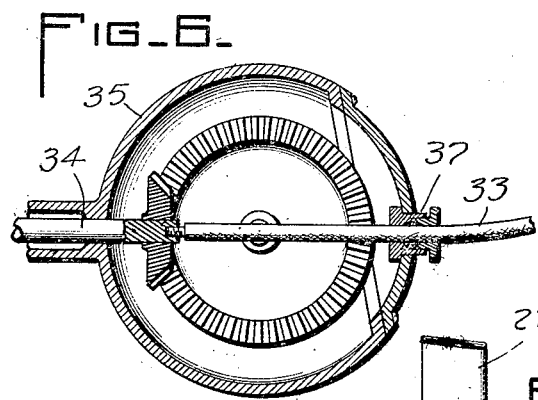
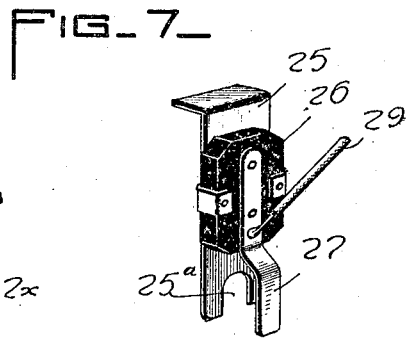
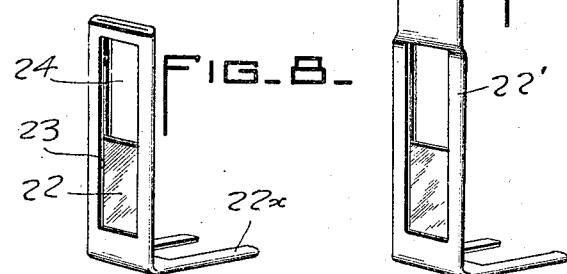
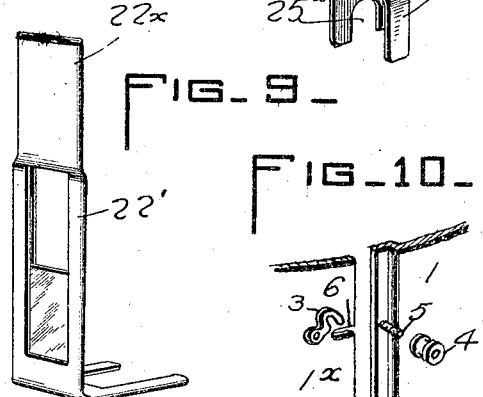
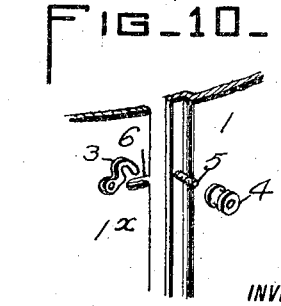
WITNESSES
INVENTOR
COWAN P. HEPLER,
BY
ATTORNEYS

UNITED STATES PATENT OFFICE.

COWAN PATTERSON HEPLER, OF SALEM, OHIO.

SIGNAL-LAMP FOR VEHICLES.

1,249,956.

Specification of Letters Patent.

Patented Dec. 11, 1917.

Application filed December 28, 1916. Serial No. 139,362.

*To all whom it may concern:*

Be it known that I, COWAN P. HEPLER, a citizen of the United States, and a resident of Salem, in the county of Columbiana and State of Ohio, have invented a certain new and useful Improvement in Signal-Lamps for Vehicles, of which the following is a specification.

My invention relates to improvements in signal lamps for vehicles, such as automobiles and the like, and it consists in the combinations, constructions, and arrangements herein described and claimed.

An object of my invention is to provide a rear signal which will indicate the slowing down or stopping of the vehicle, and which will also indicate the forward movement of the vehicle when the latter has attained a predetermined speed.

A further object of my invention is to provide a device of the type described which is connected with the driving mechanism of the automobile, and which works automatically without any attention on the part of the driver.

Other objects and advantages will appear in the following specification, and the novel features of the invention will be particularly pointed out in the appended claims.

My invention is illustrated in the accompanying drawings forming a part of this application, in which:

Figure 1 is a view of the rear of an automobile showing my improved automatic signal lamp applied thereto;

Fig. 2 is a vertical section through the lamp;

Fig. 3 is a horizontal section along the line of Fig. 2;

Fig. 4 is a view partly in section of a modified form of the device;

Fig. 5 is a front view of a portion of the device;

Fig. 6 is a section through the differential casing, showing the means for attachment of the flexible driving shaft;

Fig. 7 is a perspective view of a contact block;

Fig. 8 is a perspective view of a slidable glass holder;

Fig. 9 is a perspective view of a modified form of the slidable holder,

Fig. 10 is a perspective view of the locking means for the door of the lamp; and Fig. 11 is a diagrammatic view of a modified form of lens.

In carrying out my invention I provide a casing 1 which is preferably cylindrical in shape, and which is made of metal or other suitable material. This casing has a portion 1$^x$ which is hinged at 2, see Fig. 3, and which constitutes a door, a fastening means including a hook 3 and a nut 4 arranged to screw on to the threaded pin 5, and which is designed to pass through a slot 6 in the casing 1, being the preferred means for fastening the door portion, but it will be understood that any suitable means may be used in lieu thereof.

A bottom 7 and a top 8 have bearing portions for a central shaft 9 which has a common axis with the cylindrical casing. Near the bottom this shaft is threaded, as shown at 10, and is provided with a threaded block 11 having ears 12 to which is attached a spring 13, the opposite end of the spring being secured to a centrifugal member 14 which is pivotally connected at 15 to the shaft 9.

A slidable collar 16 is provided with a groove 17, and is arranged to move along the shaft 9, this collar being pressed on by a spring 18, one end of which is securely fastened to the shaft 9. The spring 13 is stronger than the spring 18, and the parts are held normally, that is to say, when the vehicle is standing still in the position shown in Fig. 2, in which the collar 16 is raised.

Carried by the casing is a reflector 19 which is shown substantially conical in the present instance, but which may be of any suitable shape, such as a paraboloid. The reflector casing 19 carries a glass 20, which is preferably colored a light green. The rear end of the reflector casing is formed into a threaded socket arranged to receive an electric light bulb 21.

Extending vertically through the reflector casing is a slidable glass holder of L-shaped form, as shown at 22, in Fig. 8. This holder is provided at its bottom with a piece of ruby glass 23, the upper portion 24 of the holder being open. The lower portion of the holder has laterally extending arms 22, arranged to enter the groove 17 of the collar 16.

Secured to the top 8 and to the reflector casing 19, is a plate 25, which bears a block 26 having a spring contact 27. The plate 25 is recessed at 25$^a$ to receive the threaded portion of the reflector casing, being in electrical contact with the latter.

A conductor 28 is in connection with the plate 25, while another conductor 29 is in connection with the spring 26. These conductors 28 and 29 lead to a switch and battery, not shown. In this connection it may be stated that the above construction permits one side of the battery to be grounded, but obviously the ordinary construction in which insulation is used in the socket may be employed without departing in the least from the spirit or scope of the invention.

The lamp is supported by means of a bracket 30 upon any suitable portion of the vehicle. At 31 I have shown an opening, by means of which the rays of light from the lamp 21 may be thrown upon the number plate 32. The end of the shaft 9 is connected by a flexible transmission 33 with the end of the final drive shaft 34 in the differential casing 35, see Fig. 6. A stuffing box 37 is provided for permitting the rotation of the flexible drive member 33 without permitting loss of lubricant. It will be seen that the flexible connection is rigidly secured to the end of the final drive by means of a screw or in any other suitable manner.

From the foregoing description of the various parts of the device, the operation thereof may be readily understood. Normally, as stated, when the vehicle is standing still, the parts are in the position shown in Fig. 2, in which the red or ruby glass 23 is in front of the light 21. This will show red through the light green glass, and will indicate that the vehicle is at a standstill, or that it is going very slowly, say, below six miles an hour. When the vehicle is in motion, the shaft 9 is rotated and when the vehicle attains a given speed, the rotation will be sufficient to cause the centrifugal member 14 to be thrown outwardly, so that the upper end is drawn downwardly, thereby permitting the collar 16 to descend partly by gravity and partly by the action of the spring 18, so as to bring the open space 24 in front of the bulb 21. The signal will now show light green to indicate that the vehicle is receding from the observer at a speed above a predetermined rate.

In Figs. 4, 5, and 9 I have shown a modified form of the device, in which the glass holder 22' bears an extension 22$^x$ which is painted red, and which, when raised, is adapted to cover a plate 22$^y$ carried by the cover 8 and which is painted green.

The operation of the modified form is similar to that of the preferred form, that is to say, when the vehicle reaches a predetermined rate of speed, the glass holder 22' will be lowered, thereby showing a green light at night, and a red light when the device is standing still. In the daytime the current from the electric bulb may be cut off, but the operation of the device will be the same and will cause the red plate 22$^z$ to descend so as to uncover the green plate when the vehicle has reached a certain speed, and to ascend and display a red signal when the vehicle is slowing down or when it has stopped.

The construction described enables one to withdraw or replace the electric bulb 21 by removing the colored plate 20 in the reflector casing 19, pushing the slidable plate holder 22 downwardly, and reaching through the opening 24 through which the bulb may be easily manipulated. This obviates the necessity of dismantling the device to insert the bulb.

There are other uses to which this device may be put, among which is to give a visible signal to a traffic officer as to whether a vehicle is exceeding a certain speed. For instance, if the laws of a town are that vehicles shall not exceed eight miles an hour, and a vehicle equipped with my improved signal device set at eight miles an hour should exceed this speed at night, then that fact would be immediately indicated by the green light which would automatically be displayed.

If the laws of any particular section require that a red light shall be displayed on the rear of moving vehicles at all times after dark, then I would propose to use the lens shown in Fig. 11, in which the portion of the lens marked 20$^r$ is red, while that portion of the lens marked 20$^g$ is light green. Thus, the red light will always be displayed, but the green light will indicate that the vehicle is proceeding above a certain speed.

I claim:—

1. In a signal light for vehicles, a cylindrical casing, a rotatable shaft disposed within the casing on the central axis thereof, a reflector casing carried by said main casing, an electric light bulb carried by said reflector casing, a holder for colored plates arranged to slide through said reflector casing, in front of said bulb, and centrifugal means carried by said shaft for moving said slidable plate holder to bring a predetermined color in front of said electric bulb at a predetermined speed of the shaft.

2. In a signal light for vehicles, a cylindrical casing, a rotatable shaft disposed within the casing on the central axis thereof, a reflector casing carried by said main casing, an electric light bulb carried by said reflector casing, a holder for colored plates arranged to slide through said reflector casing in front of said bulb, centrifugal means carried by said shaft for moving said slidable plate holder to bring a predetermined color in front of said electric bulb, at a predetermined speed of the shaft, said centrifugal means comprising a spring actuated centrifugal member pivotally secured to said shaft, a slidable collar carried by the shaft and adapted to be held normally in an upper position, a pair of arms carried by said plate holder and arranged to engage a groove in said collar, and a spring for moving said collar.

3. A signal lamp for vehicles comprising a casing, a rotatable shaft carried thereby, a centrifugal device carried by the shaft and arranged to be moved to different positions depending upon the speed of the shaft, means connected with the driving mechanism of the vehicle for rotating the shaft, a source of light within the casing, a holder for colored transparent plates movable into the path of light, said holder being connected with said centrifugal device, a fixed color plate carried at the top of the casing, and a color plate carried by said slidable holder and arranged to project through the top of the casing when the holder is in its upper position and to cover said first named color plate.

COWAN PATTERSON HEPLER.